Feb. 3, 1970 HANS DIETRICH KRUG 3,493,449
PROCESS FOR THE MANUFACTURE OF MOLDED FOAM
ARTICLES FROM POLYURETHANES
Filed Jan. 10, 1966

INVENTOR.
HANS DIETRICH KRUG
BY
*Burgess, Dinklage & Sprung*
ATTORNEYS.

United States Patent Office 3,493,449
Patented Feb. 3, 1970

3,493,449
PROCESS FOR THE MANUFACTURE OF MOLDED
FOAM ARTICLES FROM POLYURETHANES
Hans Dietrich Krug, Heidelberg, Germany, assignor to
Carl Freudenberg, Weinheim, Bergstrasse, Germany,
a corporation of Germany
Filed Jan. 10, 1966, Ser. No. 519,767
Claims priority, application Germany, Oct. 12, 1965,
F 47,399
Int. Cl. B32b 5/20, 31/24; B29b 6/02
U.S. Cl. 156—79
9 Claims

ABSTRACT OF THE DISCLOSURE

Method of making foamed polyurethane bodies which comprises providing foamable polyurethane precursors into a suitably shaped mold, placing a non-woven fabric across the mouth of the mold and then placing a cover over the non-woven fabric over the mouth of the mold such as not to substantially interfere with the porosity and fibrous structure of the non-woven fabric; the foamable polyurethane precursor is thereupon permitted to foam, whereby driving the air entrapped in the mold prior to foaming out of the mold through the non-woven fabric because of its porosity. When the foaming polyurethane reaches the non-woven fabric it tends to penetrate the interstices and increases in viscosity upon such penetration, whereby significantly preventing the escape of the foamed polyurethane through these interstices.

---

Figure 1:
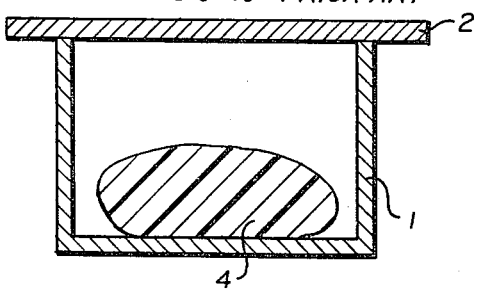
Figure 4:
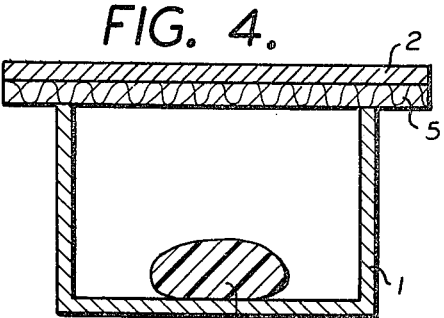
Figure 2:
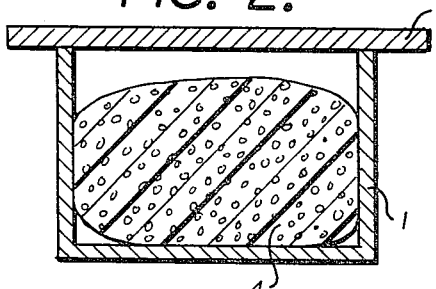
Figure 5:
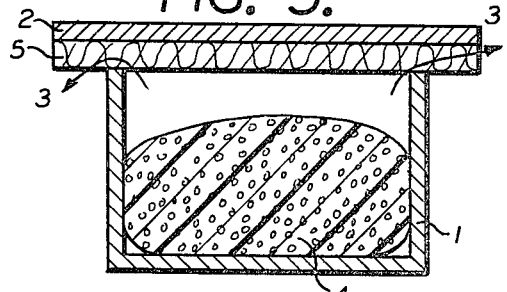
Figure 3:
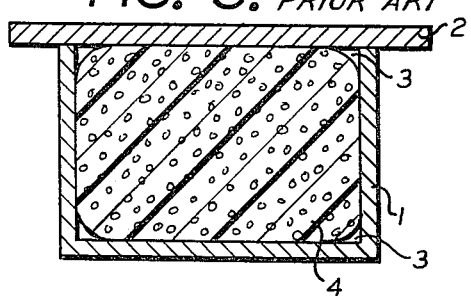
Figure 6:
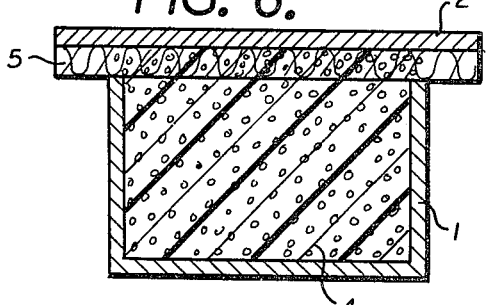
Figure 7:
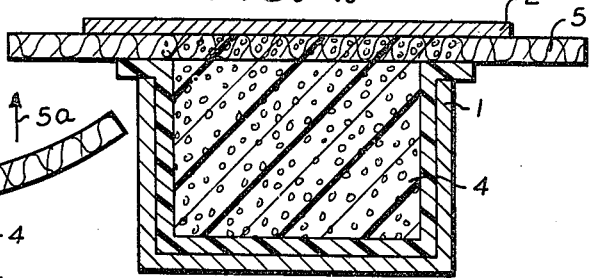
Figure 8:
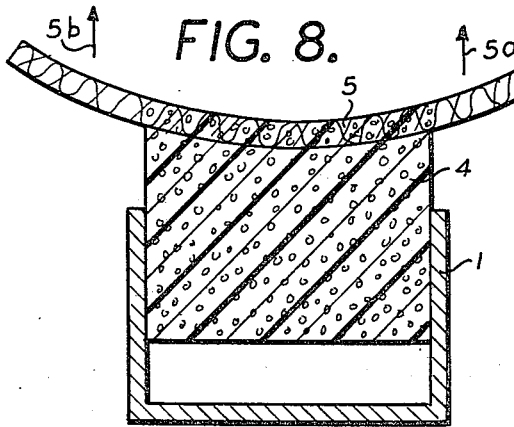

The present invention relates to a novel method and apparatus for the manufacture of molded foam articles from polyurethanes. More specifically, the present invention relates to a method for manufacturing molded foam articles from polyurethanes, in which urethane foam precursors are placed in an enclosable mold, after which a porous fiber sheet is placed over the mold opening and a mold cover placed over such a sheet in such a manner so that the porosity of the sheet is substantially unaltered at the periphery of the mold opening.

The manufacture of polyurethane foams by the reaction of polyisocyanates, polyols and water is known in the prior art. Generally speaking, this reaction involves the formation of a polyurethane resin by the reaction of a diisocyanate and a diol, such as alkylene glycols and polyoxyalkylene glycols, such reaction being generally represented by the formula:

(I) 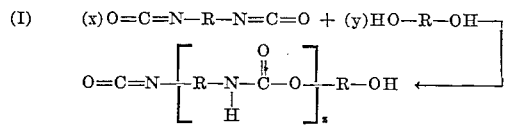

This reaction proceeds at room temperature as does the reaction of a diisocyanate with water to form carbon dioxide, which is used as a blowing or a foaming agent in the manufacture of such urethane foams, according to Formula II given below (II) 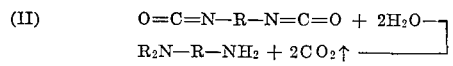

Thus, it can be seen from the above reactions that the manufacture of polyurethane foams involves the in situ generation of a blowing agent at room temperatures simultaneously with the formation of a polymer derived from the reaction of polyisocyanates and polyols.

It is further known in the prior art that polyurethane foams formed in such a manner may be improved upon if sufficient reactants are introduced into a mold which may be completely closed, so that the polyurethane foam is produced under pressure. In this process, the formation of the blowing agent carbon dioxide continues after the mold cavity is filled up with foam and consequently generates internal pressure on the foam structure which results in the formation of a molded foam body having maximum stability.

In manufacturing polyurethane foams according to this method, difficulties are encountered with the formation of large gas pockets that prevent the foamed polyurethane from filling all the contours and extremities of the mold.

It is therefore an object of this invention to overcome these and other difficulties encountered in the prior art. More specifically, it is an object of the present invention to provide a method and apparatus for the manufacture of molded foam articles from polyurethanes, in which filling the extremities and contours of a closed mold is facilitated and in which the formation of gas pockets is obviated during the formation of a urethane foam in situ and under pressure.

These and other objects have been achieved according to the present invention, a better understanding of which may be had by reference to the attached drawings, in which FIGS. I, II and III represent the state of the prior art with respect to the formation of gas pockets and incompletely filled molds when forming a polyurethane foam under pressure in a closed mold, and in which FIGS. IV–VIII illustrate an embodiment of the present invention, in which a fibrous sheet 5 is interposed between the mold cover 2 and the mold 1 so as to form a porous seal around the periphery of the mold opening and the mold cover.

A further understanding of the prior art difficulties may be had by reference to FIGS. I through III. For example, if the mold 1 in FIG. I is closed by means of cover 2 to form an airtight seal between the two of them, entrapped air cannot escape when the polyurethane foam precursors 4 expand. It is necessary, however, that the seal between cover 2 and mold 1 is airtight so as to obtain the advantages of forming a polyurethane foam under pressure, by which a foam body having maximum stability is obtained. The polyurethane precursors 4 comprise 60 parts desmophene (containing 1.5% $H_2O$) polyol
40 parts Desmodur (trademark, Farbenfabriken Bayer, A.G., Leverkusen) polyisocyanate.

These particular polyurethane foam precursors are mixed so that a quantity of carbon dioxide is generated sufficient to not only foam the ingredients within the enclosure of the mold cavity of mold 1, but also to provide for forming the foam under pressure. It will be seen, however, that the entrapped air in the mold cannot escape when the foam expands, as illustrated in FIG. II. FIG. III further illustrates the formation of air pockets 3 in the corners of the mold when the foam expands to the mold cover 2. The gas pressure in these pockets 3 is so great that they resist the expansion of the foam into the corners of the mold, therefore making it impossible for the foamed mass to completely fill out the mold.

Some prior art suggestions propose ot lay onto a mold 1 and a cover 2 which is not ground flat, so that the mold does not close completely. In this case, the air displaced by the foam cam escape, however, with the constant escape of foam through the non-airtight areas, no appreciable overpressure can be built up within the mold, and the physical properties of the final product, such as strength, etc., are adversely affected. Furthermore, the foam that is forced out through the abutting areas of the mold cover and mold tend to adhere to the walls of the mold and the cover, and consequently, when the process is repeated using the same mold, the irregularities in the molded article are amplified by the foam residue that has dried on cover 2 and mold 1. Furthermore, the peripheries of the mold opening and mold cover are so irregular with the accumulation of dried polyurethane residues that substantially greater quantities of foam can escape at the leakage areas, and consequently, the forming of such foams under pressure becomes practically impossible. To prevent this, both mold 1 and cover 2 must be carefully cleaned before each use. This, naturally, results in production delays.

It has now been found, according to the present invention, that by relatively simple means it is possible both for the entrapped air to escape and to form a perfect airtight seal between the mold and mold cover at the most favorable moment during foam formation, usually that point after which all the air has escaped from the mold and the urethane has completely filled the extremities and cavities of the mold. This is effected by a porous fiber sheet 5 which is placed on the mold before the cover 2 is laid onto the mold 1, as illustrated in FIG. IV. Prior to covering the mold, a charge of polyurethane foam precursors is inserted therein, and the mold is additionally preheated to 80° C. to accelerate the foaming action. The expanding foam pushes the entrapped gas ahead of it, but this gas can easily escape through the pores of the fiber sheet 5, as illustrated in FIG. V.

When the foam has finally completely filled the mold 1, it commences to fill the pores of fiber sheet 5, as illustrated in FIG. VI. The polyurethane foam that penetrates fiber sheet 5 tends to clog the pores of this sheet, since the foam is also hardening while it is expanding into any free area in the mold cavity. It should be noted in this respect that the pores or interstices of the fiber sheet 5 may in this sense be considered part of the free area of the mold cavity. In this manner, a complete sealing of the mold is automatically produced at the critical moment, as illustrated in FIG. VI.

It is expedient to lay a fiber sheet 5 of relatively large area over mold 1, as shown in FIG. VII, since after foaming has been completed under pressure and cover 2 has been removed, the sheet of fiber material will adhere tightly to the foam, and the finished foam product can then be lifted out of the mold 1 by pulling it out by projecting ends 5a and 5b, as shown in FIG. VIII.

Needled fiber bats are especially suited as the fiber sheet material. The manufacture of needled fiber bats is known in the prior art and is described, for example, in "Textile Industries," September 1958, page 117. Instead of needled bats, battings bonded with a bonding agent can also be used as well as absorbent filter papers and fabrics well known in the art. The fibers of the sheet material preferably have a high absorbency so as to produce a more intimate bond between the foam and the sheet. It is not necessary that the fiber sheet material consist only of absorbent cotton combing waste. In many cases, the incorporation or substitution of other fibers such as perlon and nylon fibers is recommendable. Other fiber materials that fall within the broad scope of the invention comprises cotton, jute, hemp, silk, ramie, and any natural fiber well known in the art. Other synthetic fibers that may be used include the polyethylene glycol terephthalates or other polyester resins, spandex, polyolefins, such as polyethylene, polypropylene and the like, as well as nitrile polymer fibers, such as vinyl cyanide or acrylonitrile, acrylic acid and acrylic ester polymers, vinyl polymers, such as vinyl chloride, vinyl acetate, and vinylidene chloride, and fibers formed from modified natural materials, such as nitrocellulose, rayon and casien, any combination thereof, graft polymers thereof and mixtures thereof.

If needled bats are used, the weight is to amount to about 30 to 100 g./m.² In the case of lower weights, the bat, under certain circumstances, might not completely absorb the foam that penetrates it. In that case, foam again reaches the surface of mold 1 and cover 2, which causes them to be gummed up. Also, a light bat might prove to be too weak to facilitate the extraction of the product from the mold in the manner described above with respect to FIG. VIII.

Other criteria that must be taken into account when selecting a fiber bat include the thickness, porosity, type of fiber, type of weave, e.g., woven, knit, and non-woven, as well as the type of resinous material used should a non-woven resinous bonded fiber be employed. All of these variables may be manipulated so that the sheet will permit passage of gas being forced from a urethane foam mold and will also absorb a sufficient quantity of foamed urethane that will harden to seal the pores so that further passage of gas therethrough is impossible, and in a short enough period of time, so that the urethane resin will not escape from the mold in any appreciable quantities before hardening. All of these factors are variables that may be adjusted and are well within the skill of the art. For example, certain fiber or fiber combinations may prove more effective than others and may be altered accordingly.

Further in this regard, excessively thin bats have a comparatively low pore volume, and consequently, have a low capacity for absorbing resinous as well as adhesive materials. This is disadvantageous when the article of manufacture produced according to this invention, comprising a mass of urethane foam adhered to a fiber sheet, is adhered to another article by means of an adhesive. For example, a "foot-bed sole" may be manufactured according to the present invention and adhered to an outer sole. The permanency of this adhesion to the outer sole would be impaired if excessively thin bats were used in manufacturing the "foot-bed sole." Excessively thick bats are not employed in some instances because of the expense; furthermore, such bats often prove so dense that gases escape too slowly from them, and in many cases, air pockets again are formed. Fabrics described in German Patent 920,211 may be used instead of needled bats. Such fabrics are presolidified on one side by a coating of covering foam. Generally, non-woven, woven or knit fabrics may be used.

Very loose bats in which the fibers have no bond at all with one another are practically unusable, because they are extremely difficult to handle. Suitable handling machinery, however would obviate this difficulty, and otherwise undesirable materials would be usable from a manufacturing viewpoint. This is not to say, however, that such loose bats may not be used in the present invention; on the contrary, they are suitable, but other materials are more easily used.

Non-woven fabrics containing a bonding agent in an amount of approximately 70 parts by weight may be used, however, tend to delaminate when the foamed urethane is extracted from the mold, as illustrated in FIG. VIII. Fabrics of this type are to be avoided when a laminate of polyurethane to a fabric is desired, however, this phenomenon may be used to advantage where no bonding between fabric and foamed urethane is desired. Additionally, it has also been observed that fabrics containing large quantities of bonding agent absorb little polyurethane foam, and as a result, such foam is forced through the pores of the fabric to such an extent that it gums up the mold and cover. Similar difficulties may occur if tight fabrics and papers are used.

The present invention may be varied in many ways. For example, after the enclosable mold has been greased or waxed, a sheet of PVC can be inserted into it, as shown in U.S. Patent 2,976,577, and the foaming can then be carried out in the usual manner. In this case, the molded foam article will be enveloped on three sides by a solid protective skin. In contrast to the process of U.S. Patent 2,976,577, however, the PVC sheet will not be rigidly clamped between the mold 1 and the cover 2, according to the present invention.

The method of the present invention may be used to manufacture parts for footwear such as shoe soles and the like. For example, a PVC sheet is inserted in the deep part of an enclosable mold having the contours of a shoe sole, after which urethane foam precursors are poured on the PVC and then a sheet of fiber material laid across the mold and finally a lid placed on the sheet to substantially seal the mold. Again, clamping of the PVC sheet between the mold and cover must be avoided. In this procedure, a "foam sole" is obtained which is coated with PVC on the surface on which the foot rests. The fiber sheet material is on the bottom side and is later cemented to the actual outer sole of rubber or leather. By pulling on the margins of the fiber sheet, the entire foam sole (also called a "foot-bed sole") is lifted without difficulty out of the mold.

Particularly advantageous is the fact that the lower surface laminated to a layer of fibers can be ground off. The ground surface can then be cemented more easily to the outer sole.

The process of the invention for the manufacture of foam materials comprising polyurethane is also applicable to any polymers or equivalents which foam by themselves and set substantially without the application of heat. If substantially room temperature curing cannot be effected the sealing of the mold with the aid of a fiber sheet material as descirbed cannot be realized.

The use of a mold made of cold-vulcanized silicone rubber is preferred. In this case, the polyurethane foam body automatically coats itself on all sides which come in contact with the walls of such a silicone mold, thereby forming a relatively solid skin of non-porous polyurethane at the interface of the foamed polyurethane and mold walls. The mold cover can in this embodiment be made of any desired material, since it does not come in contact with the expanding foam due to the fiber bat placed between it and the foam.

What is claimed is:

1. In the method of manufacturing a mold shaped article of polyurethane foam which comprises introducing foamable polyurethane precursors into a mold cavity, overlaying the mold cavity mouth with a substantially impervious cover and permitting the foamable polyurethane precursors to foam, the improvement which comprises providing a non-woven fabric adherable to said polyurethane foam interposed between the mold cavity and the mold cavity cover entirely across the mold cavity mouth while substantially retaining the porosity of said non-woven fabric between said cover and said mold, whereby during said foam formation air entrapped in said mold, when said cover is applied, is permitted to escape therefrom through the interstices of said non-woven fabric and whereby, when said polyurethane foam enters the interstices of said non-woven fabric by reason of said foaming, simultaneously the viscosity of said foam in said interstices substantially increases, whereby, when said mold and said interstices are filled with said foam, sealing said mold and thereby preventing the escape of said polyurethane foam out of said mold through said interstices.

2. The method of claim 1 where said precursors comprise polyisocyanates, polyglycols and minor amounts of water.

3. The method according to claim 1 where said fiber sheet comprises a needled bat.

4. The method according to claim 3 where said needled bat comprises absorbent fibers.

5. The method of claim 1 where said mold comprises a cold-vulcanized silicone rubber mold.

6. The mehod of claim 1 comprising holding said cover rigidly in place with respect to said mold and foaming said precursors under pressure.

7. The improved method claimed in claim 1 including providing a sheet of polyvinyl chloride between said foamable polyurethane precursor and the wall of said mold cavity, which sheet extends between said non-woven fabric and the lips of said mold cavity.

8. A mold for forming polyurethane foams under pressure comprising means comprising an enclosable mold cavity; a cover sealing means at least coextensive with the opening of said mold cavity and non-woven fabric disposed between said mold cover means and said means defining a mold cavity, wherein said non-woven fabric substantially retains its porosity between said mold cover and said means defining said mold cavity.

9. The apparatus of claim 8 where said mold comprises a cold-vulcanized silicone rubber mold.

References Cited

UNITED STATES PATENTS

| | | | |
|---|---|---|---|
| 1,610,286 | 12/1926 | Hood et al. | 156—245 X |
| 2,140,063 | 12/1938 | Talalay | 264—45 |
| 2,217,137 | 10/1940 | Roth et al. | 156—79 X |
| 2,256,329 | 9/1941 | Szerenyi et al. | 264—45 X |
| 2,429,486 | 10/1947 | Reinhardt | 156—79 X |
| 2,956,310 | 10/1960 | Roop et al. | 156—79 X |
| 3,166,227 | 1/1965 | Ragnow | 264—45 X |
| 3,170,827 | 2/1965 | Voelker | 264—45 X |
| 3,170,832 | 2/1965 | Wilson et al. | 156—245 X |
| 3,175,936 | 3/1965 | Squier et al. | 156—79 |
| 3,222,443 | 12/1965 | Dames et al. | 264—313 |

HAROLD ANSHER, Primary Examiner

C. B. COSBY, Assistant Examiner

U.S. Cl. X.R.

25—118; 156—245; 264—46, 54